United States Patent
Wang et al.

(10) Patent No.: US 6,813,006 B1
(45) Date of Patent: Nov. 2, 2004

(54) STAND-ALONE SPEEDOMETER DIRECTLY MEASURING THE TRANSLATIONAL SPEED BASED ON THE DIFFERENCE BETWEEN DISPERSIVE DRAGGING EFFECTS OF DIFFERENT MEDIA

(76) Inventors: Ruyong Wang, 917 21st St. SE., St. Cloud, MN (US) 56304; Yi Zheng, 1605 Grizzly La., Sartell, MN (US) 56377; Aiping Yao, 2725 Edward Dr., St. Cloud, MN (US) 56301

( * ) Notice: Subject to any disclaimer, the term of this patent is extended or adjusted under 35 U.S.C. 154(b) by 0 days.

(21) Appl. No.: 10/431,492

(22) Filed: May 7, 2003

Related U.S. Application Data (60) Provisional application No. 60/378,633, filed on May 7, 2002.

(51) Int. Cl.$^7$ .................................................. G01P 3/36
(52) U.S. Cl. .................. 356/28; 356/28.5; 356/477
(58) Field of Search ................................. 356/459–483, 356/28, 28.5; 73/488–551

(56) References Cited

U.S. PATENT DOCUMENTS

| | | | | |
|---|---|---|---|---|
| 3,102,953 A | * | 9/1963 | Wallace | 378/1 |
| 4,428,234 A | * | 1/1984 | Walker | 73/514.27 |
| 4,452,531 A | * | 6/1984 | Person | 356/28.5 |
| 4,697,876 A | * | 10/1987 | Dyott | 385/12 |
| 6,034,761 A | * | 3/2000 | Takamiya | 356/28.5 |

* cited by examiner

*Primary Examiner*—Thomas H. Tarcza
*Assistant Examiner*—Isam Alsomiri (57) ABSTRACT

A stand-alone speedometer includes an electromagnetic wave source, a beam splitter, a detector and two media with different dispersive dragging effects. An electromagnetic wave is divided into two beams by the beam splitter. The two beams pass the two media differently and they combine again to go on to a detector, giving rise to interference which records the travel-time difference between two beams. Because the two media have different dispersive dragging effects on the propagation of the electromagnetic wave, measuring the change of the travel-time difference when the apparatus is stationary to that when the apparatus is moving will give the translational speed of the apparatus.

12 Claims, 9 Drawing Sheets

Moving Medium

STAND-ALONE SPEEDOMETER DIRECTLY MEASURING THE TRANSLATIONAL SPEED BASED ON THE DIFFERENCE BETWEEN DISPERSIVE DRAGGING EFFECTS OF DIFFERENT MEDIA

CROSS-REFERENCE TO RELATED APPLICATIONS

This application claims the benefit of Provisional Patent Application No. 60/378,633, filed May 7, 2002 by Ruyong Wang.

FIELD OF INVENTION

This invention is generally related to instruments of navigation and more specifically related to a speedometer.

BACKGROUND OF THE INVENTION

Up to now, all the speedometers for measuring the translational speed of a moving body either are not stand-alone or do not directly measure the speed. A speedometer that is not stand-alone uses contact information outside of the moving body. For example, the speedometer in a car only works when the wheel of the car contacts with the ground, the Pitot tube of an airplane only works when the Pitot tube probes the surrounding air, the sonar of a submarine only works when sound wave reflects from some reference objects, and the GPS receiver only works when it receives the signal from the GPS satellites. A speedometer that is not directly measuring the moving speed calculates the speed based on other measurable information. For example, the accelerometer in a navigation system measures the translational acceleration and the translational speed is determined by integrating the accelerometer output with an initial speed. The present invention provides a new method and a new speedometer that is stand-alone and directly measures the translational speed of a moving body that carries the speedometer.

SUMMARY OF THE INVENTION

In accordance with one aspect of the present invention, a stand-alone speedometer for directly measuring the translational speed of a moving body comprises an electromagnetic wave source, two media with different optical properties, a beam splitter for splitting the electromagnetic beam from the source into two beams which propagate through the two media differently and a detector for measuring the travel-time difference of the two beams.

According to another aspect of the invention, a method of directly measuring the translational speed of a moving body comprises selecting two media with different optical properties, emitting an electromagnetic wave beam from a source, splitting the beam into two beams, guiding the two beams through two media differently, combining beams, measuring the travel-time difference between beams, and converting the travel time difference to the translational speed of the moving body.

DETAILED DESCRIPTION OF SPECIFIC EMBODIMENTS

The Sagnac effect shows that there is a travel-time difference between two counter-propagating light beams traveling along a rotating path. In the recent modified Sagnac experiment conducted by Wang et al. (Ruyong Wang, Yi Zheng, Aiping Yao, Dean Langley, "A Modified Sagnac Experiment for Measuring Travel-Time Difference between Counter-Propagating Light Beams in a Uniformly Moving Fiber", Physics Letter A 312 (2003) 7), which publication is hereby incorporated by reference, the travel-time difference of two counter-propagating light beams has been observed in a uniformly and translationally moving fiber. The light source and detectors are moving together with fiber in the experiment. The Sagnac effect and the modified Sagnac experiment have demonstrated that there is a preferred frame for light propagation. The stand-alone speedometer and method for directly measuring the translational speed relative to the preferred frame according to the invention utilize the result of these discoveries.

Figure 1:
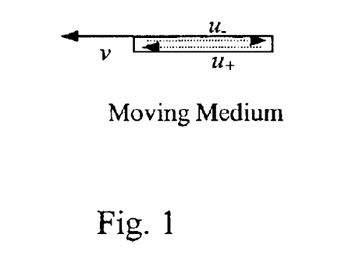
FIG. 1 shows the propagation of light in a moving medium for a stationary observer.

In this invention, the medium dispersion property of light propagation and the effect shown by the modified Sagnac experiment are utilized to measure the transnational speed of a moving body and are shown generally as follows:

For a stationary observer, the speed of light in a moving medium with the refractive index n is given by (FIG. 1)

$$u_+ = c/n + fv$$

$$u_- = c/n - fv$$

with a drag coefficient $f = 1 - 1/n^2 - (\lambda/n)(dn/d\lambda)$, where $\lambda$ is the wavelength. The last term in the drag coefficient is the medium dispersive term, which can be called as the first-order dispersive dragging effect since this effect is proportional to the moving speed v. The term $(\lambda/n)(dn/d\lambda)$ is denoted by D for convenience, therefore we have $$u_+ = c/n + (1 - 1/n^2 - D)v$$

$$u_- = c/n - (1 - 1/n^2 - D)v.$$

Figure 2:
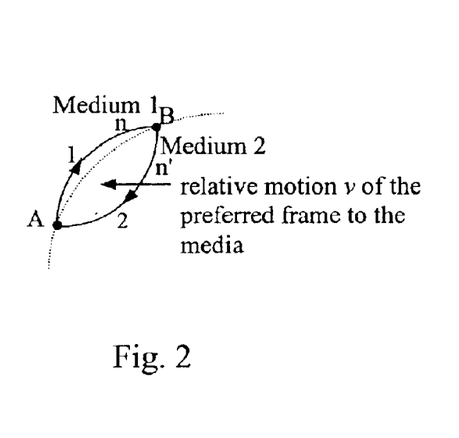
FIG. 2 shows the propagation of light in two media for a moving observer.

In FIG. 2, A and B are two fixed points in refractive media, path 1 is a path in medium 1 and path 2 is a path in medium 2. A light bean goes forward through path 1 from A to B and returns back through path 2 from B to A.

Because the dispersive term in drag coefficient, the light speed for a moving observer at a speed of v is:

$$u = c/n + (v \cdot e')(1/n^2 + D)$$

where e' is a unit vector in the direction of the path.

$$1/u = 1/[c/n + (v \cdot e')(1/n^2 + D)].$$

Ignoring the high order terms, we have $$1/u = n/c - (v \cdot e')(1 + n^2 D)/c^2$$

The travel time in path 1, $$t'_1 = \int_1 ds/u$$
$$= (1/c) \int_1 n\, ds + (1/c^2)\left(v \cdot \int_1 ds\right) + (n^2 D/c^2)\left(v \cdot \int_1 ds\right).$$

The travel time in path 2, $$t'_2 = \int_2 ds/u$$
$$= (1/c) \int_2 n'\, ds - (1/c^2)\left(v \cdot \int_2 ds\right) + (n'^2 D'/c^2)\left(v \cdot \int_2 ds\right).$$

Since $$\left(v \cdot \int_1 ds + v \cdot \int_2 ds\right) = v \cdot \left(\int_1 ds + \int_2 ds\right) = 0,$$

the total travel time $$t' = t'_1 + t'_2 = \int_1 ds/u + \int_2 ds/u$$
$$= (1/c)\left(\int_1 n\, ds + \int_2 n'\, ds\right) -$$
$$(1/c^2)\left[v \cdot \left(n^2 D \int_1 ds + n'^2 D' \int_2 ds\right)\right].$$

Generally, $$(1/c^2)\left[v \cdot \left(n^2 D \int_1 ds + n'^2 D' \int_2 ds\right)\right]$$

is not zero. Thus, the total travel time is related to v. Therefore, there is a first-order effect caused by dispersive dragging effects and a stand-alone speedometer can have a high sensitivity.

If medium 1 is a normal dispersion medium and medium 2 is an anomalous dispersion medium, the difference between the total travel time on a stationary body and a moving body will be large. Other combinations of the media can also be used, e.g., medium 1 is a normal dispersion medium and medium 2 is vacuum.

Figure 3:
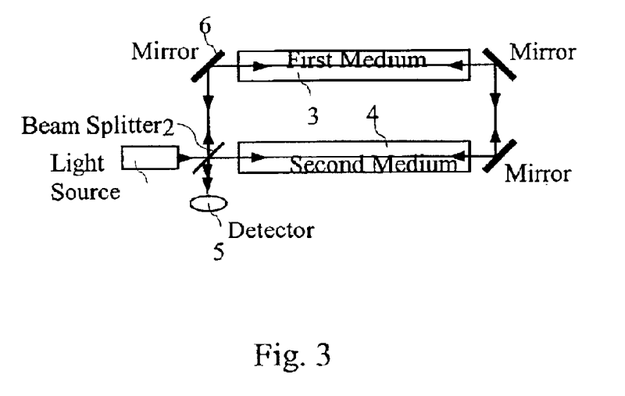
FIG. 3 shows the basic construction of the stand-alone speedometer.

The basic construction of the stand-alone speedometer is described hereunder with reference to FIG. 3. A light beam from the light source 1 is divided by a beam splitter 2 into two beams. One beam propagates to mirror 6 and goes forward by passing through the first medium 3 with a length of L. Then the beam reflects on mirrors and returns back by passing through the second medium 4 with a length of L. The other beam goes forward by passing through the second medium 4 and reflects on mirrors. Then the second beam returns back by passing through the first medium 3 and reflects on the mirror. The two beams are combined and interfered at the beam splitter 2. The interference fringes and travel time difference are detected at the detector 5. Examining the fringe shift, we can find the change of the travel time difference from that appears when the body is stationary to that appears when the body is moving relative to the preferred frame with a speed of v. The specific calculation of the time difference for this construction is given as follows:

When the speedometer is stationary, the two beams have the same travel time.

Let $t_+$ be the travel time of a beam in the first moving medium when the direction of the light propagation is the same as the motion of the medium; $t_-$ be the travel time of a beam in the first moving medium when the direction of the light propagation is opposite to the motion of the medium. Let $t'_+$ be the travel time of a beam in the second moving medium when the direction of the light propagation is the same as the motion of the medium; $t'_-$ be the travel time of a beam in the second moving medium when the direction of the light propagation is opposite to the motion of the medium. With these definitions, the travel time of beam 1 in moving media is $t_1 = t_+ + t'_-$ and the travel time of beam 2 in moving media is $t_2 = t'_+ + t_-$. It is not needed to consider the travel time in other parts because they are the same for the two beams. Hence, the difference between two travel time intervals is $$\Delta t = t_1 - t_2 = (t_+ + t'_-) - (t'_+ + t_-) = (t_+ - t_-) - (t'_+ - t'_-).$$

For a stationary observer, the first medium of the length L is moving with the speed v, so the first medium itself will move a distance of $vt_+$ in $t_+$. Therefore, beam 1 travels a total distance of $L + vt_+$ in the first medium. Then, we have $$u_+ t_+ = L + vt_+.$$

Thus, $$t_+ = L/(u_+ - v) = L/[c/n - (1/n^2 + D)v].$$

Similarly, for a light beam traveling against the motion of the first medium, we have $$t_- = L/(u_- + v) = L/[c/n + (1/n^2 + D)v].$$

Finally, we obtain $$t_+ - t_- = L/[c/n - (1/n^2 + D)v] - L/[c/n + (1/n^2 + D)v]$$

Neglecting the quantities of the second and higher orders of v/c, $$t_+ - t_- = 2vL(1 + n^2 D)/c^2,$$

Similarly, we have $$t'_+ - t'_- = L/[c/n' - (1/n'^2 + D')v] - L/[c/n' + (1/n'^2 + D')v] = 2vL(1 + n'^2 D')/c^2.$$

Therefore, the difference between two travel time intervals is $$\Delta t = t_1 - t_2 = (t_+ - t_-) - (t'_+ - t'_-) = 2vL(n^2 D - n'^2 D')/c^2 = 2vL[n\lambda(dn/d\lambda) - n'\lambda(dn'/d\lambda)]/c^2.$$

The fringe shift, $\Delta f = \Delta t c/\lambda = 2vL[n\lambda(dn/d\lambda) - n'\lambda(dn'/d\lambda)]/c\lambda$. This is a first-order effect in v/c. Utilizing this effect, we can directly measure the translational speed of a moving body relative to the preferred frame, $v = \Delta t c^2/2L[n\lambda(dn/d\lambda) - n'\lambda(dn'/d\lambda)]$ or $v = \Delta f c \lambda/2L[n\lambda(dn/d\lambda) - n'\lambda(dn'/d\lambda)]$. As an example of showing how large the fring shift is, if the first medium is a SF56A glass with $n\lambda(dn/d\lambda) = 0.2029$ for $\lambda = 0.532$ μm, and the second medium is air or vacuum with $n'\lambda(dn'/d\lambda) = 0$, $\Delta f = 2vL[n\lambda(dn/d\lambda) - n'\lambda(dn'/d\lambda)]/c\lambda = 0.107$ when v=40 m/s and L=1 m.

This speedometer has several features:
1) Two beams in the speedometer propagate in the same route, just in opposite directions. Therefore, this speedometer is very stable optically. It is important for a speedometer mounted on a vehicle.
2) When the body is stationary, the two beams in the speedometer have the same path lengths. Inserting phase modulation means into the paths of two beams will increase the sensitivity of the speedometer.
3) When the speedometer is moving with a speed v, comparing measured travel time differences before and after turning the speedometer 90 degrees will directly measure that speed because after turning 90 degrees we have $\Delta t_{(90)}=0$. Therefore, the measurement is convenient and is just comparing the fringes before and after turning 90 degrees, i.e., $v=[\Delta t-\Delta t_{(90)}]c^2/2L[n\lambda(dn/d\lambda)-n'\lambda(dn'/d\lambda)]$ or $v=[\Delta f-\Delta f_{(90)}]c\lambda/2L[n\lambda(dn/d\lambda)-n'\lambda(dn'/d\lambda)]$.
4) Comparing measured travel time differences before and after turning the speedometer 180 degrees will double the effect. After turning 180 degrees, the speed v becomes speed −v and we have $\Delta t_{(180)}=-2vL[n\lambda(dn/d\lambda)-n'\lambda(dn'/d\lambda)]/c^2$. Therefore, comparing the fringes before and after turning, we have $\Delta t-\Delta t_{(180)}=4vL[n\lambda(dn/d\lambda)-n'\lambda(dn'/d\lambda)]/c^2$ or $\Delta f-\Delta f_{(180)}=4vL[n\lambda(dn/d\lambda)-n'\lambda(dn'/d\lambda)]/c\lambda$.
5) Passing the same route N times for each beam will increase the effect by a factor of N.

Figure 4:
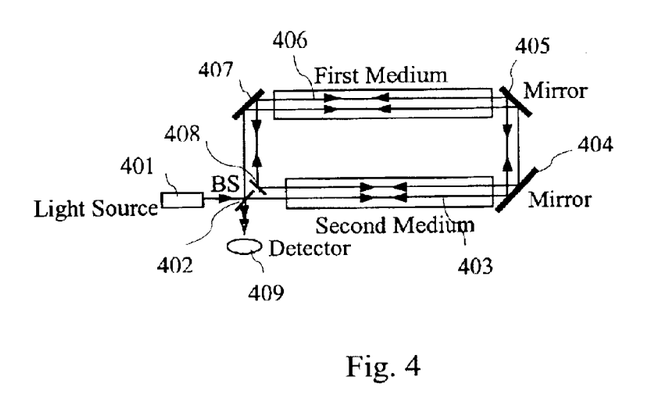
FIG. 4 shows an example of the basic construction of the stand-alone speedometer with light propagating twice through the media.

For example, each beam can pass the media twice and the final effect will be doubled (FIG. 4).

Figure 5:
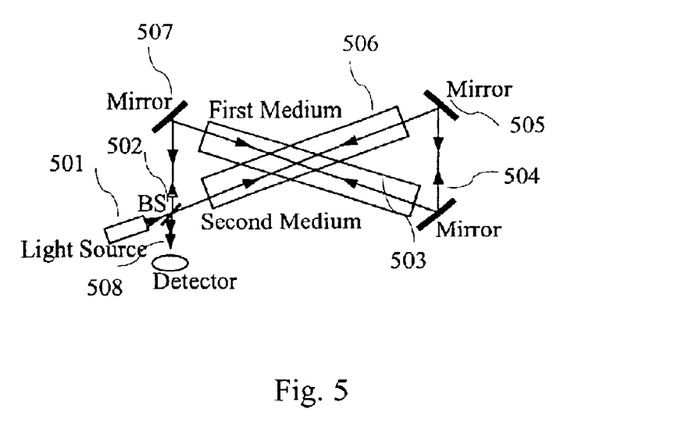
FIG. 5 shows an example of the basic construction of the stand-alone speedometer with two light beams across propagating.

6) As shown in FIG. 5, the speedometer constructed with the crossed media is insensitive to rotation because the Sagnac effect caused by rotation for this arrangement is zero. Therefore, the speedometer will only detect the purely translational motion.

Using fiber and fiber technology strengthens the structure, increases the effect and increases the accuracy. An alternative construction of the stand-alone speedometer is described hereunder with reference to FIG. 6. A light beam from the light source 11, e.g., a laser, is divided into two beams by a coupler 12 and the two beams will pass the two single-mode fiber media 13 and 14 alternately many times in opposite directions. The travel-time difference between two counter-propagating beams is detected at the detector 15. By measuring the phase shift, $\Delta\phi=2\pi\Delta tc/\lambda$, the speedometer directly measures the translational speed of a moving body relative to the preferred frame with a very high precision.

Figure 6:
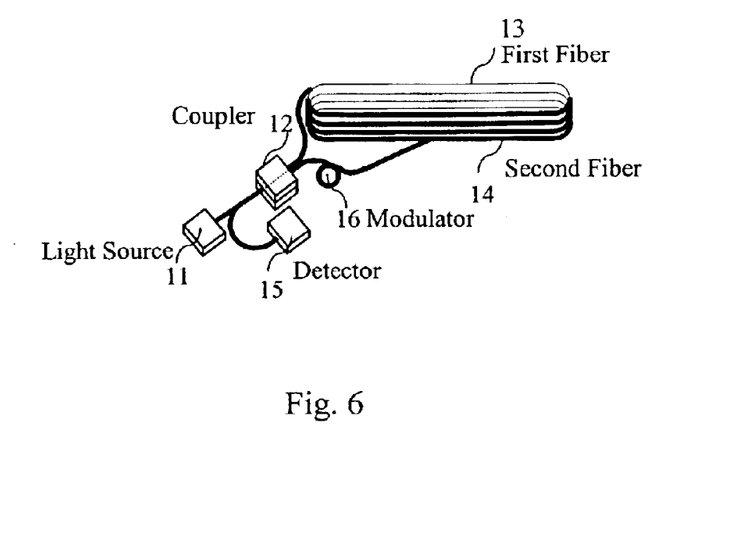
FIG. 6 shows an alternative construction of the stand-alone speedometer using fiber technology.

Using two couplers will make the path lengths of two beams are exactly the same, therefore, the phase shift is exactly zero when the speedometer is stationary. Adding a modulator 16 will increase the sensitivity of the apparatus when the phase shift is small. Twisting the fiber loop, hence the paths of two light beams across each other will make the apparatus insensitive to rotation because the Sagnac effect caused by rotation for this arrangement is zero. Therefore, the speedometer will only detect the purely translational motion.

Figure 7:
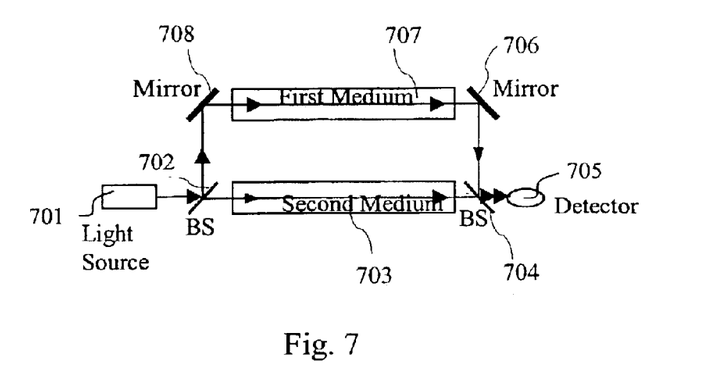
FIG. 7 shows a construction of the stand-alone speedometer in which two beams pass through different paths in different media.

Another alternative construction of the stand-alone speedometer is described hereunder with reference to FIG. 7. There the source and the beam splitter are in one place and the detector and the beam splitter are in another place. Two beams pass the different paths in different media. Although optical stability of this arrangement is not as excellent as previous ones, it will produce more travel time difference caused by the motion.

Figure 8:
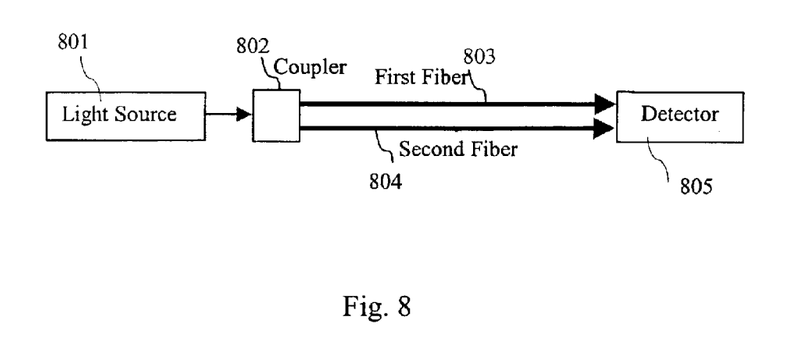
FIG. 8 shows a construction of the stand-alone speedometer in which two beams pass through two different fibers.

Using fiber and fiber technology, an alternative construction of the stand-alone speedometer is described hereunder with reference to FIG. 8. A light beam from the light source, a laser, is divided into two beams by a coupler and the two beams will pass the two different single-mode fiber media. The traveling-time difference of two beams will be detected by the detector. The fiber can be twisted to eliminate the effect caused by rotation.

Figure 9:
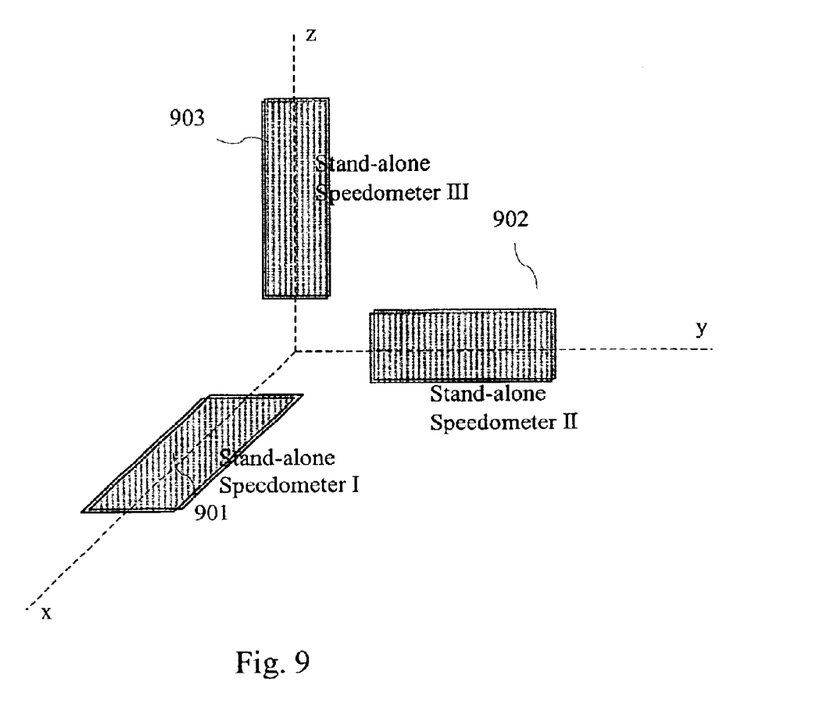
FIG. 9 shows an arrangement of three speedometers for measuring motion in three-dimension space.
Figure 10:
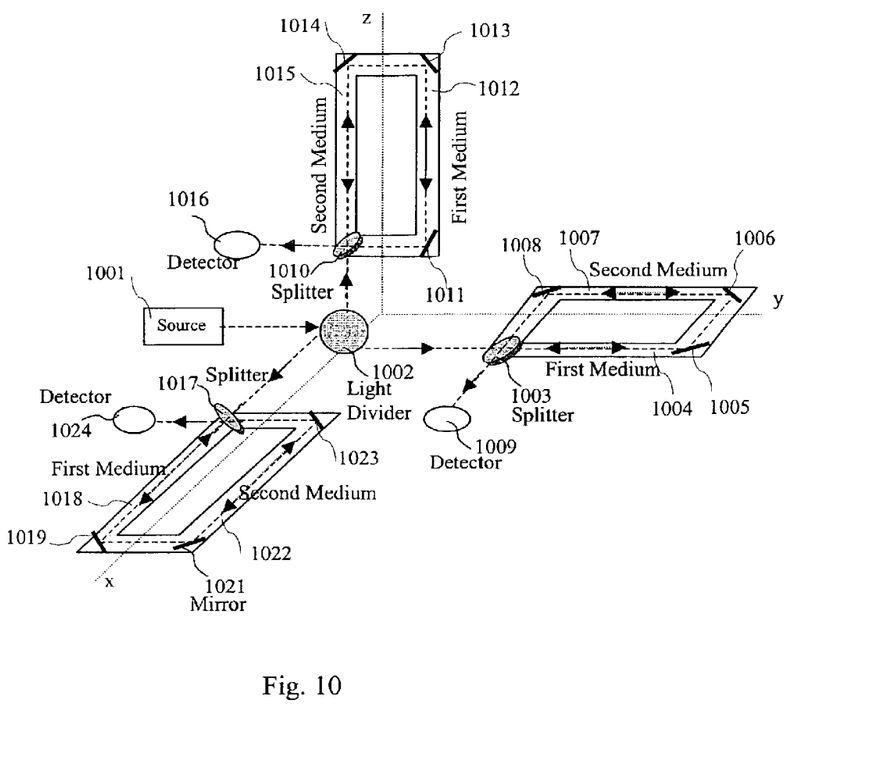
FIG. 10 shows an arrangement of three speedometers sharing one light source for measuring motion in three-dimension space.

An apparatus using three stand-alone speedometers can measure motion in three-dimensional space. The structure of the apparatus is described hereunder with reference to FIG. 9. The direction of a speedometer is perpendicular to other two speedometers. The structure of each stand-alone speedometer is described in the previous text of this invention. Measured translational speeds in three directions determine the motion in the space. An alternative structure of the apparatus measuring three-dimensional motion is described hereunder FIG. 10. One light source provides the source for all three speedometers that are perpendicular each other. The structure of each stand-alone speedometer is identical to that described in FIG. 3. The similar arrangement can be done to combine three light sources as one light source for the apparatus measuring the three-dimensional motion if the three stand-alone speedometers are those described in FIG. 6, or FIG. 7, or FIG. 8.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A speedometer, comprising:
   a. an electromagnetic wave source for emitting an electromagnetic beam,
   b. two media with different dispersions,
   c. a beam splitter for splitting the electromagnetic beam from said wave source into two beams which propagate through said two media differently,
   d. a beam combiner for combining said two beams,
   e. a detector for measuring the travel time difference between the said two beams,
   whereby said speedometer will be a stand-alone speedometer for measuring the translational speed of a moving body.

2. The speedometer of claim 1 wherein said beam splitter and said beam combiner are one beam splitter which acts both splitting and combining.

3. The speedometer of claim 1, further including phase modulation means inserted into the paths of two beams for increasing the sensitivity of said detector to the travel time difference.

4. The speedometer of claim 1 wherein said two media with different dispersions are normal dispersion medium and anomalous dispersion medium, respectively.

5. The speedometer of claim 1 wherein said two media with different dispersions have vacuum as a medium.

6. A speedometer, comprising:
   a. a light source for emitting a coherent light beam,
   b. two fiber optic cables with different dispersions,
   c. a coupler for splitting the coherent light beam from said light source into two beams which propagate through said two fiber optic cables differently, d. a coupler for combining said two beams, e. a detector for measuring the travel time difference between said two beams, whereby said speedometer will be a stand-alone speedometer for measuring the translational speed of a moving body.

7. The speedometer of claim 6 wherein said coupler and said combiner are one coupler which acts both splitting and combining.

8. The speedometer of claim 6 further including phase modulation means inserted into the paths of two beams for increasing the sensitivity of said detector to the travel-time difference.

9. The speedometer of claim 6 wherein said two different fiber optic cables with different dispersions are normal dispersion fiber and anomalous dispersion fiber, respectively.

10. The speedometer of claim 6 wherein said two different media have a vacuum fiber.

11. A method of directly measuring the translational speed of a moving body comprising, a. selecting two media with different optical properties, b. emitting an electromagnetic beam from a source, c. splitting said beam into two beams, d. guiding the first beam of said two beams forward through the first medium of said two media and back through the second medium of said two media and guiding the second beam of said two beams forward through the second medium of said two media and back through the first medium of said two media, e. combining the two beams exiting said two media, f. measuring the travel time difference between said two beams, g. converting said travel time difference to the translational speed of the moving body.

12. A method of directly measuring the translational speed of a moving body comprising, a. selecting two media with different optical properties, b. emitting an electromagnetic beam from a source, c. splitting said beam into two beams, d. guiding the first beam of said two beams forward through the first medium of said two media and guiding the second beam of said two beams forward through the second medium of said two media, e. combining the two beams exiting said two media, f. measuring the travel time difference between said two beams, g. converting said travel time difference to the translational speed of the moving body.

* * * * *